(12) United States Patent
Newman et al.

(10) Patent No.: US 9,945,950 B2
(45) Date of Patent: *Apr. 17, 2018

(54) METHOD FOR LOCALIZING A VEHICLE EQUIPPED WITH TWO LIDAR SYSTEMS

(71) Applicant: Oxford University Innovation Limited, Oxford (GB)

(72) Inventors: Paul Michael Newman, Oxford (GB); Ian Alan Baldwin, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 641 days.

This patent is subject to a terminal disclaimer.

(21) Appl. No.: 14/389,723

(22) PCT Filed: Apr. 2, 2013

(86) PCT No.: PCT/GB2013/050858
§ 371 (c)(1),
(2) Date: Sep. 30, 2014

(87) PCT Pub. No.: WO2013/150286
PCT Pub. Date: Oct. 10, 2013

(65) Prior Publication Data
US 2015/0331111 A1    Nov. 19, 2015

(30) Foreign Application Priority Data
Apr. 2, 2012  (GB) .................................. 1205895.4

(51) Int. Cl.
*G01C 3/08*       (2006.01)
*G01S 17/87*      (2006.01)
(Continued)

(52) U.S. Cl.
CPC .......... *G01S 17/875* (2013.01); *G01S 7/4808* (2013.01); *G01S 17/58* (2013.01); *G01S 17/87* (2013.01); *G01S 17/89* (2013.01)

(58) Field of Classification Search
CPC ...... G01S 17/875; G01S 7/4808; G01S 17/58; G01S 17/87; G01S 17/89
See application file for complete search history.

(56) References Cited

U.S. PATENT DOCUMENTS

| 5,999,866 A | 12/1999 | Kelly et al. |
| 2007/0088478 A1 | 4/2007 | Mori et al. |

(Continued)

FOREIGN PATENT DOCUMENTS

| DE | 10 2008 041 679 A1 | 3/2010 |
| EP | 1 677 076 A2 | 7/2006 |

(Continued)

OTHER PUBLICATIONS

Perez-Cruz, Fernando. "Kullback-Leibler Divergence Estimation of Continuous Distributions." IST 2008, Toronto, Canada, Jul. 6-11, 2008. http://ieeexplore.ieee.org/stamp/stamp.jsp?arnumber=4595271.*

(Continued)

*Primary Examiner* — Samantha K Abraham
(74) *Attorney, Agent, or Firm* — Fenwick & West LLP

(57) ABSTRACT

A method of localizing transportable apparatus (200) within an environment includes receiving (402) data obtained from a first ranging sensor device (202) that is configured to collect information relating to a 2D representation of an environment (301) through which the transportable device is moving. Further data is received (404), that data being obtained from a second ranging sensor device (204) of the transportable apparatus configured to collect information relating to at least a surface (218) over which the transportable apparatus is moving. The ranging sensor device data is used (406) to estimate linear and rotational velocities of the transportable apparatus and the estimates are used (408) to generate a new 3D point cloud (212) of the environment. The method seeks to match (412) the new 3D point cloud (Continued)

with, or within, existing 3D point cloud (216) in order to localize the transportable apparatus with respect to the existing point cloud.

15 Claims, 7 Drawing Sheets

(51) Int. Cl.
    *G01S 17/58*     (2006.01)
    *G01S 17/89*     (2006.01)
    *G01S 7/48*     (2006.01)

(56) References Cited

U.S. PATENT DOCUMENTS

| | | |
|---|---|---|
| 2007/0156286 A1 | 7/2007 | Yamauchi |
| 2008/0181487 A1 | 7/2008 | Hsu et al. |
| 2008/0320036 A1 | 12/2008 | Winter |
| 2010/0021009 A1 | 1/2010 | Yao |
| 2010/0027892 A1* | 2/2010 | Guan ................ G06K 9/00355 382/203 |
| 2010/0070125 A1 | 3/2010 | Lee et al. |
| 2011/0097014 A1 | 4/2011 | Lin |
| 2011/0243379 A1 | 10/2011 | Miyajima et al. |
| 2011/0243457 A1 | 10/2011 | Miyajima |
| 2011/0243459 A1 | 10/2011 | Deng |
| 2012/0121161 A1 | 5/2012 | Eade et al. |
| 2012/0143795 A1* | 6/2012 | Han ...................... G06F 11/079 706/12 |
| 2013/0080111 A1* | 3/2013 | Dunik ....................... G06T 7/30 702/152 |

FOREIGN PATENT DOCUMENTS

| | | |
|---|---|---|
| EP | 1 975 563 A2 | 10/2008 |
| EP | 1 975 565 A2 | 10/2008 |
| EP | 2 372 310 A2 | 10/2011 |
| EP | 2 372 605 A2 | 10/2011 |
| JP | 2008-059319 | 3/2008 |
| WO | WO 2007/031947 A2 | 3/2007 |

OTHER PUBLICATIONS

Bay, H., et al., "SURF: Speeded Up Robust Features," Proceedings of the Ninth European Conference on Computer Vision, May 2006, 14 Pages.
Besl, P. et al., "A Method for Registration of 3-D Shapes," IEEE Transactions on Pattern Analysis and Machine Intelligence, Feb. 1992, pp. 239-256, vol. 14, No. 2.
Biber, P., et al., "Dynamic Maps for Long-Term Operation of Mobile Service Robots," Proceedings of Robotics: Science and Systems, 2005, 8 Pages.
Bosse, M. et al., "Continuous 3d Scan-Matching with a Spinning 2d Laser," 2009 IEEE International Conference on in Robotics and Automation, ICRA'09, IEEE, May 12-17, 2009, pp. 4312-4319.
Bosse, M., et al., "Map Matching and Data Association for Large-Scale Two-dimensional Laser Scan-based SLAM," The International Journal of Robotics Research, vol. 27, No. 6, Jun. 2008, pp. 667-691.
Calonder, M., et al., "BRIEF: Binary Robust Independent Elementary Features," Lecture Notes in Computer Science: BRIEF, 2010, 14 Pages.
Cornelis, N., et al., "Fast Scale Invariant Feature Detection and Matching on Programmable Graphics Hardware," IEEE Computer Society Conference on Computer Vision and Pattern Recognition Workshops, Jun. 23-28, 2008, Anchorage, Alaska, USA, 8 Pages.
Cummins, M., et al., "Highly Scalable Appearance—Only SLAM—FAB—MAP 2.0," Proceedings of Robotics: Science and Systems, Jun. 2009, Seattle, Washington, USA, 8 Pages.
Fillatreau, P., et al., "Localization of an Autonomous Mobile Robot from 3D Depth Images using heterogeneous Features," Proceedings of the 1993 IEEE/RSJ International Conference on Intelligent Robots and Systems, Jul. 26-30, 1993, Yokohama, Japan, 8 Pages.
Fraundorfer, F., et al., "Topological mapping, localization and navigation using image collections," Proceedings of the 20007 IEEE/RSJ International Conference on Intelligent Robots and Systems, Oct. 29-Nov. 2, 2007, San Diego, California, USA, 6 Pages.
Furgale, P., et al., "Visual Teach and Repeat for Long-Range Rover Autonomy," Journal of Field Robotics, vol. 27, No. 5, 2010, pp. 534-560.
Grisetti, G., et al., "A Tree Parameterization for Efficiently Computing Maximum Likelihood Maps using Gradient Descent," Proceedings of Robotics: Science and Systems, Jun. 2007, Atlanta, Georgia, USA, 8 Pages.
Intellectual Property Office of the United Kingdom, Patent Application No. GB1202344.6, dated Jun. 11, 2012, 2 Pages.
Konolige, K., et al., "View-Based Maps," Proceedings of Robotics: Science and Systems, Jun. 2009, Seattle, Washington, USA, 12 Pages.
Konolige, K., et al., "Towards Lifelong Visual Maps," The 2009 IEEE/RSJ International Conference on Intelligent Robots and Systems, Oct. 11-15, 2009, St. Louis, Missouri, USA, 8 Pages.
Kummerle, R. et. al. "Autonomous Driving in a Multi-Level Parking Structure," IEEE International Conference on IEEE Robotics and Automation, 2009. ICRA'09, 2009, pp. 3395-3400.
Levinson, J. et al., "Map-Based Precision Vehicle Localization in Urban Environments," in Proceedings of the Robotics: Science and Systems Conference, 2007, pp. 121-128.
Levinson, J. et al., "Robust Vehicle Localization in Urban Environments Using Probabilistic Maps," 2010 IEEE International Conference on IEEE in Robotics and Automation (ICRA), 2010, pp. 4372-4378.
Mei, C., et al., "Efficient homography-based tracking and 3D reconstruction for single viewpoint sensors," IEEE Transactions on Robotics, vol. 24, Issue 6, Dec. 2008, 10 Pages.
Mei, C., et al., "RSLAM: A System for Large-Scale Mapping in Constant-Time using Stereo," International Journal of Computer Vision, vol. 94, Issue 2, Sep. 2011, 17 Pages.
Milford, M., et al., "Persistent Navigation and Mapping using a Biologically Inspired SLAM System," The International Journal of Robotics Research, Jul. 21, 2009, 24 Pages.
Moosmann, F. et al., "Velodyne Slam" 2011 IEEE Intelligent Vehicles Symposium (IV), Jun. 5-9, 2011, pp. 393-398.
Morales, Y. et al., "Vehicle Localization in Outdoor Mountainous Forested Paths and Extension of Two-Dimensional Road Centerline Maps to Three-Dimensional Maps," Advanced Robotics, 2010, pp. 489-513, vol. 24, No. 4.
Nistér, D., et al., "Visual Odometry for Ground Vehicle Applications," Journal of Filed Robotics, vol. 23, Issue 1, Jan. 2006, 35 Pages.
PCT International Search Report and Written Opinion, International Patent Application No. PCT/GB2013/050299, dated Oct. 17, 2013, 22 Pages.
PCT International Preliminary Report on Patentability, PCT Application No. PCT/GB2013/050299, dated Aug. 21, 2014, 16 pages.
PCT Written Opinion, PCT Application No. PCT/GB2013/050858, dated Jul. 24, 2013, 6 Pages.
PCT International Preliminary Report on Patentability, PCT Application No. PCT/GB2013/050858, dated Oct. 7, 2014, 7 pages.
Rosten, E., et al., "Real-time Video Annotations for Augmented Reality," Proceedings of the First International Conference on Advances in Visual Computing, Springer-Verlag Berlin, Heidelberg, Germany, 2005, 8 Pages.
Schindler, G., et al., "City-Scale Location Recognition," IEEE Conference on Computer Vision and Pattern Recognition, Jun. 17-22, 2007, Minneapolis, Minnesota, USA, 8 Pages.
Patent Cooperation Treaty, International Search Report, International Patent Application No. PCTGB2013/050858, dated Jul. 24, 2013, 3 Pages.

(56) References Cited

OTHER PUBLICATIONS

Saravanan, K. et al., "An Intelligent Driver Assistant System (I-DAS) for Vehicle Safety Modelling Using Ontology Approach," International Journal of UbiComp (IJU), Jul. 2010, pp. 15-29, vol. 1, No. 3.
European Examination Report, European Application No. 13715420.9, dated Apr. 12, 2017, 4 pages.

* cited by examiner

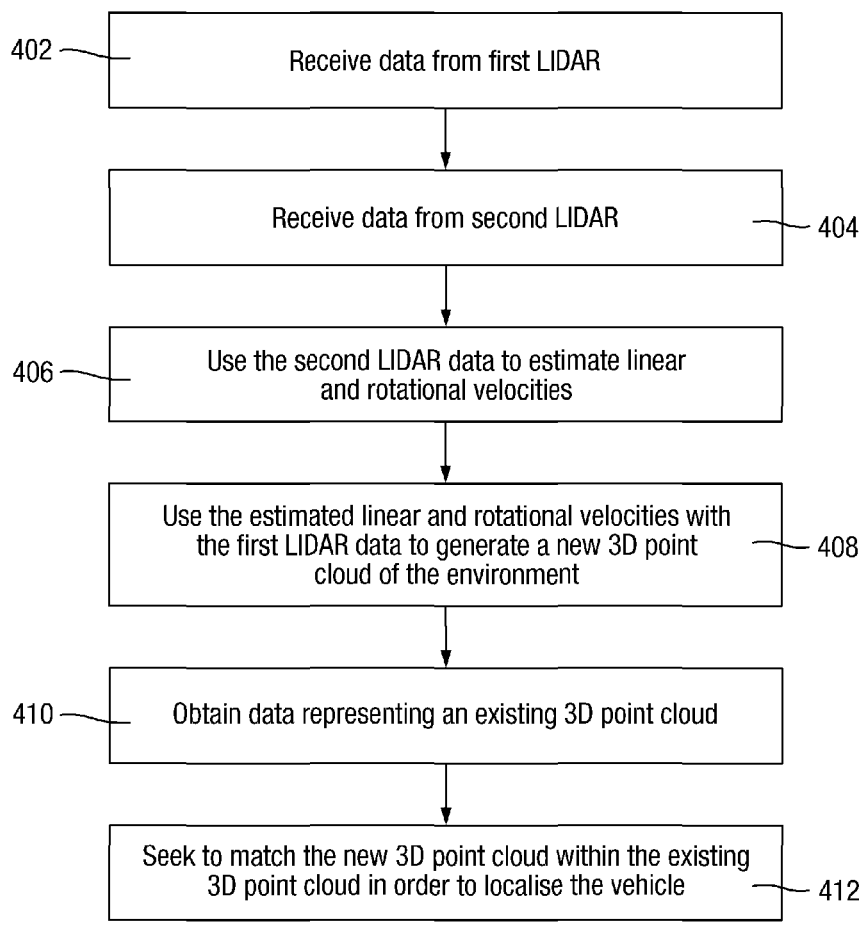

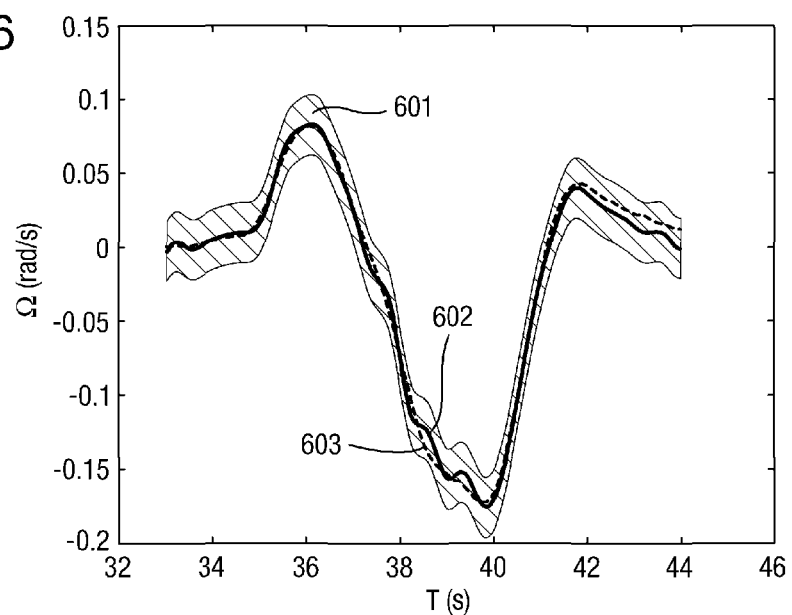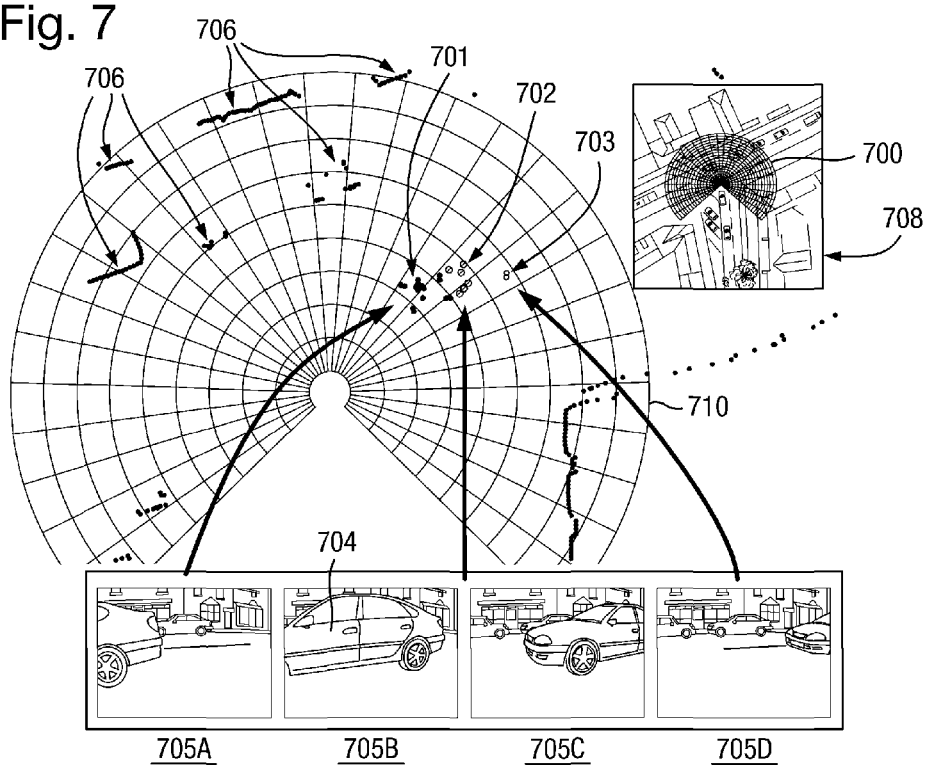

METHOD FOR LOCALIZING A VEHICLE EQUIPPED WITH TWO LIDAR SYSTEMS

The present invention relates to localising transportable apparatus within an environment and also to identifying dynamic locations within an environment.

To achieve goals, such as long term autonomy and accurate localisation, systems must be able to function in changing environments. Change can come from many sources, such as sudden structural change, lighting conditions, time of day, weather and seasonal change. The scan-matching approach commonly used for indoor environments is prone to failure when exposed to a challenging real-world outdoor environment. One-shot 2D planar maps are insufficiently descriptive to enable accurate, long-term localization in a complex, dynamic environment.

Considering the specific example of a section of an environment comprising a building site, this would present a highly dynamic scene over time. Point-cloud differences in maps built using a commercial Inertial Navigation System (INS) system using data collected several days apart will be striking. FIG. 1 depicts the typical performance of a conventional Iterative Closest Surface (ICS) scan-matching algorithm with a large delay (10 days) between map-building and localization. As can be seen at approximately x=0; y=120, the system has failed completely to produce a scan-match estimate (illustrated by thick solid line 101). This can be attributed to the distinct changes in the environment in the building site. It will also be noted that the vertical shift between the INS estimate (dashed line 102) and the localization estimates within the previous map; this noticeable drift is an artefact of GPS signal quality.

Laser-based outdoor localization of road vehicles using prior maps has been previously addressed by several authors. Levinson et. al. (in J. Levinson, M. Montemerlo, and S. Thrun, "Map-based precision vehicle localization in urban environments," in Proceedings of the Robotics: Science and Systems Conference, 2007) utilized a Velodyne laser sensor fused with GPS, IMU and odometry data to generate a precise offline map, which is then used in conjunction with a particle filter to estimate position. This approach required an expensive, actuated sensor or offline relaxation. The same authors extended this work in J. Levinson and S. Thrun, "Robust vehicle localization in urban environments using probabilistic maps," in Robotics and Automation (ICRA), 2010 IEEE International Conference on IEEE, 2010, pp. 4372-4378, where they developed a long-term probabilistic framework, again employing a Velodyne.

Kummerle et. al. (in R. Kummerle, D. Hahnel, D. Dolgov, S. Thrun, and W. Burgard, "Autonomous driving in a multi-level parking structure," in Robotics and Automation, 2009. ICRA'09, IEEE International Conference on IEEE, 2009, pp. 3395-3400) developed an autonomous system that utilizes multi-level surface maps obtained from a Velodyne to represent the environment with a 2.5D structure. In F. Moosmann and C. Stiller, "Velodyne slam" in Intelligent Vehicles Symposium (IV), 2011 IEEE, pp. 393-398, the Velodyne was utilised in a SLAM framework. The authors of Y. Morales, T. Tsubouchi, and S. Yuta, "Vehicle localization in outdoor mountainous forested paths and extension of two-dimensional road centerline maps to three-dimensional maps," Advanced Robotics, vol. 24, no. 4, pp. 489-513, 2010 utilized a 2D road network map and a laser in conjunction with a Differential GPS-enabled receiver to estimate pose. Again, this approach required an expensive, calibration-intense device (such as the Velodyne) or a persistent GPS signal in order to conduct long-term navigation.

In M. Bosse and R. Zlot, "Map matching and data association for large-scale two-dimensional laser scan-based slam," The International Journal of Robotics Research, vol. 27, no. 6, p. 667, 2008, the authors utilized a robust Iterative Closest Point (ICP) algorithm (see P. Besl and N. McKay, "A method for registration of 3-d shapes," IEEE Transactions on pattern analysis and machine intelligence, pp. 239-256, 1992) to perform local scan-matching, and incorporate a histogram feature representation to match local submaps. In M. Bosse and R. Zlot, "Continuous 3d scan-matching with a spinning 2d laser," in Robotics and Automation, 2009. ICRA'09. IEEE International Conference on. IEEE, 2009, pp. 4312-4319) the same authors utilized a rotating, scanning laser in order to generate 3D point-clouds maps.

Highly dynamic areas of environments, for example areas of heavy traffic, such as T-junctions, crossroads, etc. on a road network, are particularly problematic for localisation as well as other problems, such as object tracking. Known techniques are prone to failure when faced with such areas.

Embodiments of the present invention are intended to address at least some of the problems discussed above. Embodiments can provide a simple, robust system that can be utilized repeatedly over a long period, rather than being forced to repeatedly map the working environment. Embodiments of the present approach intentionally decline a laser to observe ground-strike, and therefore eschew the use of ICP methods which, given the scanning pattern of the beam, gives rise to multiple local minima. Embodiments can leverage accurate relative short-term consistency of scan-matching to provide local velocity estimates, which can then be integrated with the declined LIDAR (Light Detection and Ranging) data, building a rich map swathe that is then used in an information-based map-matching algorithm that allows for repeatable, global localization in a prior map. Embodiments can operate using a framework that makes use of the relative consistency of scan-matching, coupled with a dense 3D swathe in an information-based map-matching algorithm that is robust to abrupt scene changes. Embodiments include a LIDAR-only system that can provide accurate pose estimates over the long term.

According to a first aspect of the present invention there is provided a method of localising transportable apparatus within an environment, the method including or comprising:

receiving data obtained from a first ranging sensor device of the transportable apparatus configured to collect information relating to a 2D representation of an environment through which the transportable device is moving;

receiving data obtained from a second ranging sensor device of the transportable apparatus configured to collect information relating to at least a surface over which the transportable apparatus is moving in the environment;

using the second ranging sensor device data to estimate linear and rotational velocities of the transportable apparatus moving through the environment;

using the estimated linear and rotational velocities with the first ranging sensor device data to generate a new 3D point cloud of the environment;

obtaining data representing an existing 3D point cloud, and seeking to match the new 3D point cloud with, or within, the existing 3D point cloud in order to localise the transportable apparatus with respect to the existing point cloud.

The first and/or the second ranging sensor device may comprise a LIDAR device. In use, a beam of the second LIDAR device may be aimed to continually (although in some cases, short intervals between beam transmission are possible) strike the surface whilst the transportable device is moving. The second LIDAR device may be directed at an angle generally corresponding to a main horizontal axis of the transportable device. The first LIDAR device may be declined at an angle in a range of around 10° to 90° with respect to a main horizontal axis of the transportable device.

The step of using the second LIDAR device data to estimate the linear and the rotational velocities can include scan-matching successive laser scans of the second LIDAR device data. The scan-matching can include an Iterative Closest-Surface (ICS) technique.

The method may further include:

creating a probabilistic filter for computing motion transiency values for portions of the second LIDAR device data, and wherein the probabilistic filter is used to select portions of the second LIDAR device data to be used for the scan-matching.

Portions of the second LIDAR device data may represent locations within the environment and the method may further include:

generating polar coordinate representations of the locations in the second LIDAR device data portions;

partitioning the polar representations into a vector X, where a cell $X_i$ of the vector is a binary variable denoting transiency of data at a location cell i (having polar coordinates θ, r) in the second LIDAR device data;

obtaining an observation function $y_i$ corresponding to a noisy estimate of motion transiency of the cell i based on a historical record of motion transiency relating to the cell location;

modelling a joint distribution based on a said cell $X_i$ from the vector X and the corresponding observation function $y_i$, and using the joint distribution to determine the transiency value of the cell location.

The linear velocity and the rotational velocity can each be modelled as a Gaussian Process (GP). The second LIDAR device data may be windowed over a time period and the GP model can be based on the windowed data.

The seeking to match step may comprise computing a transformation between the new point cloud and the existing point cloud. The computing of the transformation may include:

generating a probability distribution representing the new point cloud;

generating a probability distribution representing the existing point cloud;

comparing the new point cloud probability distribution with the existing point cloud probability distribution.

The comparing step may involve computing a Kullback-Leibler divergence value between the new point cloud probability distribution and the existing point cloud probability distribution. The Kullback-Leibler divergence value may be used to compute an objective function f:

$$f(P, Q) = \sum_{i=1}^{N} H(Q)(i) \log \frac{H(Q)(i)}{H(P)(i)}$$

where P represents the existing point cloud probability distribution, Q represents the new point cloud probability distribution, H(.) represents a histogramming operation, N represents cardinality of a said probability distribution and I is an iterator over bins.

The computing of the transformation can involve seeking a said transformation that brings the new point cloud probability distribution and the existing point cloud probability into optimal alignment by minimising the objective function.

The existing 3D point cloud may have been created using data from at least one previous data capture survey.

According to another aspect of the present invention there is provided transportable apparatus including a first ranging sensor, a second ranging sensor, and a processor configured to execute a method substantially as described herein.

According to yet another aspect of the present invention there is provided a vehicle including transportable apparatus substantially as described herein.

According to an alternative aspect of the present invention there is provided a method of identifying dynamic areas within data describing an environment, the method including or comprising:

receiving data obtained from a ranging sensor device configured to collect information relating to at least a surface over which the sensor device is moving in an environment, and computing motion transiency values for portions of the ranging sensor data.

The method may be used for localisation of the sensor device (and/or a transportable apparatus in/on which it is carried, e.g. a vehicle). Alternatively, the method may be used for object tracking.

The method may further include selecting at least one said portion of the ranging sensor data for further processing, based on the computed corresponding motion transiency value. The further processing may include estimating linear and rotational velocities of the sensor device.

The computing of the motion transiency values can include creating a probabilistic filter. The probabilistic filter may be used to select the portions of the data for the further processing.

The ranging sensor data may comprise data obtained from a LIDAR device. A said portion of the LIDAR data may represent a location and the method may include:

generating polar coordinate representations of the locations in the LIDAR data portions;

partitioning the polar representations into a vector X, where a cell $X_i$ of the vector is a binary variable denoting transiency of data at a location cell i (having polar coordinates θ, r) in the LIDAR data;

obtaining an observation function $y_i$ corresponding to a noisy estimate of motion transiency of the cell i based on a historical record of motion transiency relating to the cell location;

modelling a joint distribution based on a said cell $X_i$ from the vector X and the corresponding observation function $y_i$, and using the joint distribution to determine the transiency value of the cell location.

The joint distribution may be modelled as a Markov Random-Field (MRF). An Iterated Conditional Modes (ICM) technique may be used to determine the transiency value. The joint distribution p(X, y) may be based on equations including:

$$E(X, y) = h \sum_{i} X_i - \beta \sum_{i,j} X_i, X_j - \eta \sum_{i} X_i, y_i$$

$$p(X, y) = \frac{1}{Z}\exp\{-E(X, y)\}$$

where the equation E(X, y) is an energy term, and the equation p(X, y) is the joint probability distribution, Z is a normalisation constant and h, β and η are model parameters. An Iterated Conditional Modes (ICM) technique may be used to maximise values of X in the equations that minimise an energy term in the equation E(X, y) in order to determine the transiency value of the cell.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 4 is a flowchart showing example steps performed by the processor;

FIG. 6 is a graph showing the mean function of a Gaussian Process over a section of the rotational velocity data of FIG. 5B;

FIG. 7 is a schematic illustration of traffic at a road junction and corresponding LIDAR scans;

Figure 2:
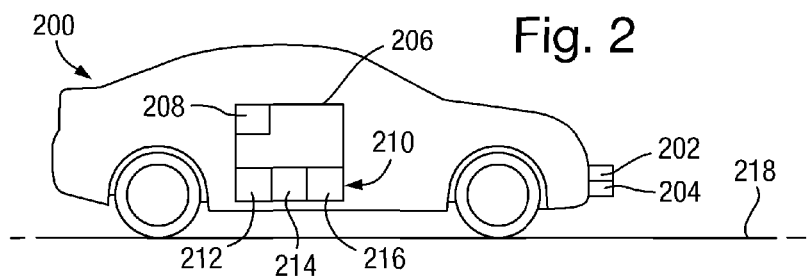
FIG. 2 is a schematic illustration of a vehicle including a transportable device having two LIDAR devices and a processor.

FIG. 2 shows schematically a transportable apparatus in the form of a vehicle 200 that is fitted with first 202 and second 204 sensors. Both sensors are LIDAR devices, but are configured differently, as will be described below with reference to FIG. 3. Although two LIDAR devices are used in the detailed embodiment, it will be understood that either or both could be replaced by any suitable ranging sensor (e.g. a laser scanner or sonar device) that is capable of producing an accurate 3D swathe and map. The vehicle further includes a computing device 206 having a processor 208 and memory 210. The computing device is in communication with the sensors 202, 204 (e.g. via a wireless communications interface) and is capable of storing and processing data 212 relating to signals received from them using an application 214.

The memory 210 further includes existing map data 216 that normally comprises a 3D point cloud of an environment. Typically, the existing map data will have been generated using data collected by at least one previous survey of the environment using a similar vehicle equipped with sensors and computing device. The computing device 206 may further include other conventional features, such as a user interface and a communications interface that allows it to exchange data with remote devices. In alternative embodiments, signals from at least one of the sensors may be transferred to a remote computing device for processing rather then being processed by an onboard computing device.

In use, the vehicles 200 travels along a surface 218 and the sensors 202, 204 capture data relating to the scene around and below the vehicle. Although the example vehicle is a land-based vehicle travelling along a road/ground surface, it will be appreciated that in alternative embodiments, the vehicle could be any type of vehicle that may be travelling above (and not necessarily in contact with) a surface that can be scanned. Further, in other embodiments, the sensors and computing device need not be fitted to/on a vehicle, but can be included in a hand-held navigation device, for example.

The application 214 is configured to process data received from the sensors 202, 204 in order to attempt to localise the vehicle 200 with respect to the existing map data 216. The application uses the data obtained from the sensors to produce a run-time generated 3D point cloud, or swathe, 212 (designated Q in the detailed discussion below) and then seeks to match this within the existing 3D point cloud 216 (designated P below) of an environment that is believed to include the environment through which the vehicle is currently moving. The existing 3D point cloud will normally be generated using data obtained during previous surveys (see discussion on experience data below).

Figure 3:
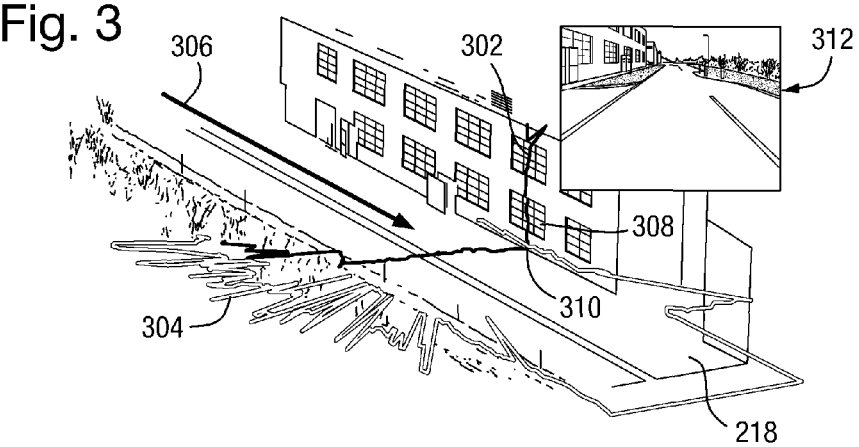
FIG. 3 illustrates use of the LIDARs as the vehicle moves through an environment.

FIG. 3 is a schematic perspective view of a typical run-time generated point-cloud (Q), with the laser of the first LIDAR device 202 shown at 302 and the laser of the second LIDAR device 204 shown at 304. The motion of the vehicle 200 as it generates the swathe data whilst moving through the environment 301 (over surface/ground 218) is indicated by the arrow 306. Clearly visible in the swathe are the window frames 308 and building edges 310. The inset image 312 shows a view of the scene from the front bumper of the vehicle. In some embodiments, the run-time cloud Q will be matched within the prior map P to provide an SE2 (Special Euclidian) pose estimate correspond to the current location of the vehicle.

The first sensor 202 is mounted "vertically", which generally means that it is oriented so as to collect data representing a series of 2D "slices" of the scene as the vehicle moves through it in a conventional manner. In general, the beam emitted by the first LIDAR device can have a declination between around 10°-90°. Sensors oriented in this way have been conventionally used on survey vehicles. The second sensor 204 is mounted "horizontally", which generally means that it is oriented so as to collect data relating to the surface/ground 303 over which the vehicle will move. As discussed below, the application 214 can use this data relating to sequential movement of the vehicle to deduce the linear and rotational velocity of the vehicle as it travels through the environment, and this velocity data can then be used along with the scene data collected by the first sensor to generate a 3D swathe representing a portion of the environment through which the vehicle has moved. In general, the beam emitted by the second LIDAR device will be generally horizontal with respect to the normal orientation/horizontal axis of the vehicle. Although an angle of 0° with respect to the horizontal is preferred because deviating from this alignment will result in a consistent bias in terms of the velocity estimation, it will be appreciated that small deviations (e.g. less than 1°) may be tolerable. Although the two sensors are depicted as being located on the front portion of the vehicle in the Figure, it will be understood that their positions on the vehicle could be varied and they need not be located adjacent each other.

The survey performed by the vehicle 200 passing through the environment 301 is referred to herein as an "experience", and can be comprised of laser-sweeps, poses, and velocities, both angular and linear. (A discussion of data collection and processing relating to experiences can be found in UK Patent Application No. 1202344.6 filed on 10 Feb. 2012; applicant: Isis Innovation Limited; title: "Method of Locating a Sensor and Related Apparatus", the contents of which are hereby incorporated by reference). The present inventors assume that survey vehicle motion estimates have been used to produce the existing 3D point-cloud, which is termed P. The task to be performed by the application 214 is to localize the vehicle with respect to the trajectory and point-cloud—defined by this prior experience—with the run-time point-cloud, Q. At run-time, the application has access to LIDAR data from the sensors 202, 204.

The 3D point-cloud, P, can be developed during the experience alongside the run-time swathe, Q, which is produced by developing the motion of the vehicle over a retrospective window $[t_k; t_{k-N}]$ (where N is the window length, in seconds). The tracking problem addressed by the application 312 is: given the point-cloud P, and the swathe developed during runtime, Q, to establish a transformation, T, that best aligns the point clouds. Alternative ways of matching the point clouds instead of computing the transformation are possible, such as building a robust feature identifier, and then matching corresponding features in the run-time swathe and the existing map in order to determine the current position.

FIG. 4 illustrates schematically an example of this method. The skilled person will appreciate that the steps are exemplary only and that in alternative embodiments, some of them may be omitted and/or re-ordered. At step 402, data relating to signals produced by the first LIDAR device 202 is received by the application 214 executing on the computing device 206. It will be appreciated that the format and presentation of the data used by the application can vary. At step 404, data relating to signals produced by the second LIDAR device 204 is received by the application.

In order to perform localisation, the application 214 needs to build the run-time 3D point cloud Q from the observed data and then use this point cloud in conjunction with the existing experience/point cloud P in order to generate SE2 poses. In order to generate the swathe/point cloud Q at runtime, the relative motion of the vehicle 200 over the windowing period is reconstructed. The system state equation is:

$$\dot{x}(t) = v(t) \begin{bmatrix} \cos\left(\int_{t_0}^{t} \omega_z(t)\, dt\right) \\ \sin\left(\int_{t_0}^{t} \omega_z(t)\, dt\right) \end{bmatrix} \quad (1)$$

where v(t) is the velocity in the vehicle frame, and w(t) is the vehicle rotational velocity. By integrating the state equation over the window period, it is possible to generate the relative vehicle motion; however, the application 214 does not have direct access to either rotational or linear velocity data. At step 406, the application estimates these velocities.

Figure 5A:
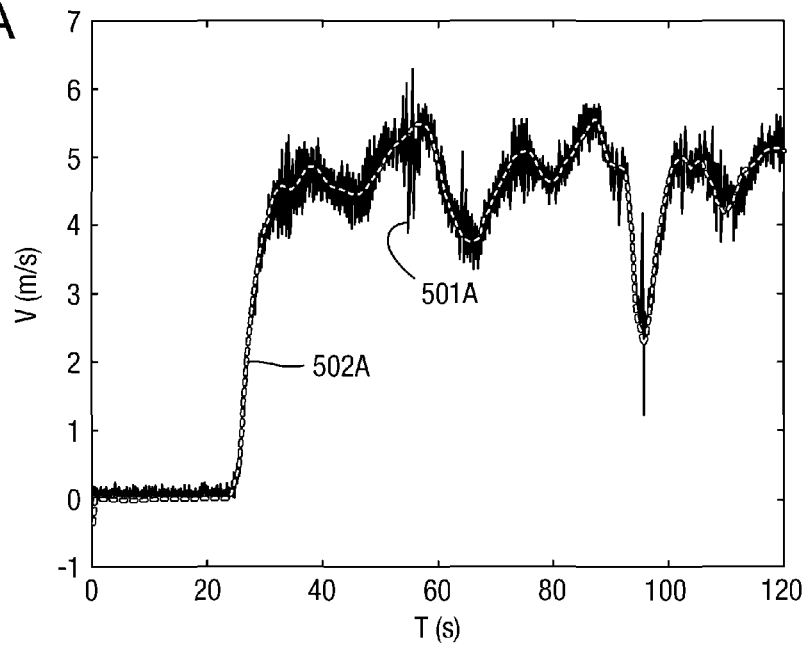
FIGS. 5A and 5B are graphs comparing estimates of linear and rotational velocities, respectively, produced by the example method with actual measurements.
Figure 5B:
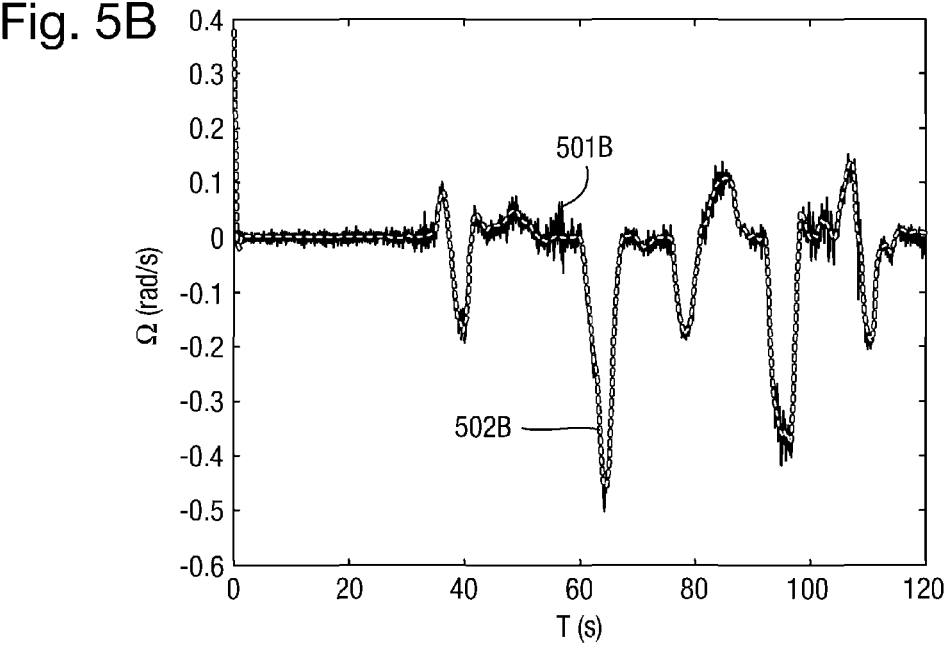

To estimate these velocities in one embodiment, Iterative Closest-Surface (ICS) scan-matching is utilized between successive (or at least closely-adjacent) laser scans in the horizontal laser produced by the second LIDAR device 204. ICS is a variant of the known Iterative Closest Point technique and other variants of that technique may also be used. Further, feature-based techniques, such as FLIRT (see Gian Diego Tipaldi and Kai O. Arras: FLIRT—Interest Regions for 2D Range Data, In Proc. of the IEEE International Conference on Robotics and Automation (ICRA), 2010) which computes features in consecutive laser scans and then optimises the alignment based on matching these correspondences, could be used. A key insight by the inventors was that there is little scene change in the scanning period (e.g. 20 ms) of the laser 204 as compared to the period between revisits by the vehicle 200. Shown in FIG. 5A is the linear velocity of the vehicle in meters per second as estimated by ICS (solid line 501A) and as measured by an on-board INS (dashed line 502A) for two minutes of driving the vehicle in an experimental run. Similarly, FIG. 5B shows the estimated (solid line 501B) and actual rotational/yaw (dashed line 502B) velocities over the same two minutes. As can be seen from these Figures, the signal is well bounded, but noisy. In one embodiment, the application 214 seeks to model the underlying velocities in a probabilistic regression framework, using Gaussian Process (GP). It will be appreciated that any regression technique that is robust to noise could be used instead of GP. Considering the input data X as time, and the output y as the velocity (linear or rotational), then the GP defined for test input X* is defined to be:

$$f_*|X, y, X_* = N(\bar{f}_*, \text{cov}(f_*)) \quad (2)$$

where $\bar{f}_*$ and $\text{cov}(f_*)$ are the mean and covariance functions:

$$\bar{f}_* \triangleq \mathbb{E}[f_* \mid X, y, X_*] \quad (3)$$
$$= K(X_*, X)[K(X, X) + \sigma_n^2 I]^{-1}$$

$$\text{cov}(f_*) = K(X_*, X_*) - K(X_*, X)[K(X, X) + \sigma_n^2 I]^{-1} K(X, X_*) \quad (4)$$

where σ is a hyperparameter for the given kernel function.

FIG. 6 shows a GP trained by maximising the marginal log-likelihood over a section of the rotational velocity data in FIG. 5B, with the 1σ bounds 601 and mean (solid line 602) against the ground-truth data (dashed line 603). Comparing the ground-truth data, it can be seen that the GP mean function captures the behaviour of the rotational velocity.

Although it could be considered computationally expensive to maintain separate processes for both the linear and rotational velocities, the windowing property renders the entire algorithm constant time (O(1)).

At step 408 of FIG. 4, the application 214 generates new point-cloud data, Q. This involves processing data relating to the laser-scan obtained using the first LIDAR device 202 as well as the velocities estimated at step 406. The laser-scan obtained using the first LIDAR device 202 can be defined as:

$$s(t) = \{r_1, \ldots r_{541}, i_1, \ldots i_{541}\} \quad (5)$$

where $r_n$ denotes the laser range reading (in meters) for beam n of scan s(t), $i_n$ is the intensity of the beam, and S={s(1), . . . , s(n)} is a collection of such scans.

Given the estimates of the velocities from the GP mean, it is now possible to integrate the state equation (Equation 1) to produce SE2 poses—xs(t)—for each scan. The laser data points S(t) can then be projected from xs(t), thereby generating the swathe Q, predicated upon time varying estimates of vehicle velocity. It can be important to ensure very accurate time synchronization between the various sensors in order to perform this task accurately. The sensor timing can be accomplished by means of the known TICSync technique (see A. Harrison and P. Newman, "TICSync: Knowing When Things Happened", Proc. IEEE ICRA, 2011). The transformation that best aligns Q with P will be the current pose, x(t).

At step 410 data relating to an existing 3D point cloud, P, representing the environment is obtained. This will normally be the same format as the run-time point cloud Q, but it will be appreciated that this need not always be the case and data conversion routines could be performed in order to carry out the subsequent processing steps.

Once the swathe Q has been developed over the window period, the alignment with the existing point-cloud P needs to be determined and at step 412, the application 214 seeks to match the run-time point could Q with, or within, the existing point cloud P in order to try to localise the vehicle. The existing point cloud P will normally comprise a larger data set than the swathe Q; however, in some cases, only a portion of the existing point cloud may be processed at one time. Further details of the localization procedure can be found in the UK patent application no. 1202344.6 referenced above. In one embodiment the application attempts to match the point cloud Q within the point cloud P by seeking the transformation T^ that brings the point-clouds P and Q into optimal alignment by minimizing an objective function f $$\hat{T} = \underset{T}{\operatorname{argmin}} f(P, \omega, v, T) \quad (6)$$

The swathe, referenced within the survey, is a function of angular rotation rate profiles, velocity profile, laser scans and the SE2 transformation that is being sought. Its generation can be factored as:

$$Q \mapsto g(\omega,v,S) \cdot T \quad (7)$$

where Equation 7 above develops the swathe point-cloud Q, and applies the transformation T to project it into the global frame. Both P and Q are distributions of points in space. The Kullback-Leibler divergence offers a way to compare two such distributions and forms the basis of the objective function f. The notation H(.) is used to represent the histogramming operation. Applying this operation to the survey and swathe the KL-divergence between hypothesized swathe (a function of T) and the survey is:

$$f(P, Q) = \sum_{i=1}^{N} H(Q)(i) \log \frac{H(Q)(i)}{H(P)(i)} \quad (8)$$

where N is the cardinality of the distribution and i is an iterator over bins. Note that if only a translation and rotation are required then it is possible to project points down into the global XY plane in order to generate the histograms.

Representing the point-clouds by their projected probability distributions is one way of capturing the structure of the environment. Prismatic structures, such as walls, are represented by a higher density as they are observed more often. Points on the ground have a naturally lower density, but are still informative about the shape and structure of the road.

Algorithm 1 below details the described optimization procedure. The algorithm takes, as input the survey experience point cloud data P, a candidate swathe Q and an initial estimate of the desired transformation $T_{guess}$ (an SE2 pose).

---

Algorithm 1 Cost function optimization

1: procedure SOLVEFORTRANSFORMATION(P, Q, $T_{guess}$)
2:     c ← $c_{init}$
3:     δ ← ∞
4:     T ← $T_{guess}$
5:     while δ > TOL do
6:        $cost_{min}$ ← ∞
7:        P ← H(P, c)
8:        P' ← P * N(0, σ)
9:        H ← BuildHistogramFilter(T)
10:       for $\hat{T}$ in H do
11:          cost ← KL(H(Transform(Q, $\hat{T}$), c), P)
12:          if cost < $cost_{min}$ then
13:            T ← $\hat{T}$
14:          end if
15:       end for
16:       δ ← ‖ T − $T_{guess}$ ‖
17:       c ← c + $c_{delta}$
18:     end while
19:     return(T)
20: end procedure

---

The histogram granularity, c is initialized to a default value, and the halting criterion for the optimization set to infinity. Line 7 makes use of the histogramming operation to produce a discrete probability density function (pdf) of the input point-cloud data with the number of bins determined by the second parameter. Line 11 defines the cost function used in the optimization procedure. This function takes as input two probability distributions, and returns the KL-divergence between them.

The granularity is increased by a quantity $c_{delta}$ at every iteration (Line 17), to provide an annealing effect. The halting measure, δ, is the difference between the previous SE2 estimate and the current estimate, and the optimization halts once this measure has reached a predefined value. The difference between the two poses is measured as given by the metric in S. LaValle, Planning algorithms. Cambridge Univ Pr, 2006, ch. 5: Sampling-based Motion Planning, p. 189, in which the orientation in a SE2 pose is expressed with a complex number representation.

At the next discrete interval, the application 214 will have observed more rotational and linear velocity data, and require a pose seed for Algorithm 1 to initiate the search. To obtain this estimate, the velocities are applied through the system state equations, to $x(t_{k-1})$ which are then used as a pose guess. The entire localization procedure is outlined in Algorithm 2 below. This algorithm is seeded with an initial pose guess, T, at system initialisation. It is then run continuously, taking in new horizontal and vertical scan data $(S_h, S_v)$. The horizontal scan data is then used to estimate the linear and rotational velocities V and Ω by running an ICS-based scan-matcher.

---

Algorithm 2 Localization Procedure

---

1: procedure RUNLOCALISATION(P)
2:    $\hat{T} \leftarrow T_{init}$
3:    loop
4:       $\{S_h, S_v\} \leftarrow (s_1^h,...,s_n^h),(s_1^v,...,s_n^v)$
5:       V, Ω ← EstimateVelocities($S_h$)
6:       Q ← BuildSubmap(V, Ω, $S_u$)
7:       $T_{guess}$ ← PredictNextPose($\hat{T}$, V, Ω)
8:       $\hat{T}$ ← SolveForTransformation(P, Q, $T_{guess}$)
9:    end loop
10: end procedure

---

Once the application 214 has an estimate of the velocities, it is possible to build the local submap Q, that is then used in the pose estimation step in Algorithm 1 to solve for the current best pose estimate T.

As mentioned above, areas of an environment having a high level of transiency (i.e. highly dynamic areas/areas tending to have a high number of objects that move relative to the scanning device) can be problematic. In the case of the present method, a highly dynamic area can degrade the algorithm performance when objects in the scan have relative velocities as compared to the vehicle. As an example, FIG. 7 shows sample LIDAR data from a busy intersection 700 of a road network. Consecutive scans 701, 702, 703 were taken using the horizontal LIDAR 204 during the passage of a car 704 through the intersection (as shown by camera shots 705A-705D), whilst the vehicle 200 remained stationary. LIDAR points that were static during the data capture interval are shown in grey at 706. The inset image 708 is an overhead view of the intersection (located in Woodstock, Oxfordshire, United Kingdom). Also shown is the partitioned scan plane 710 of the LIDAR.

Figure 8:
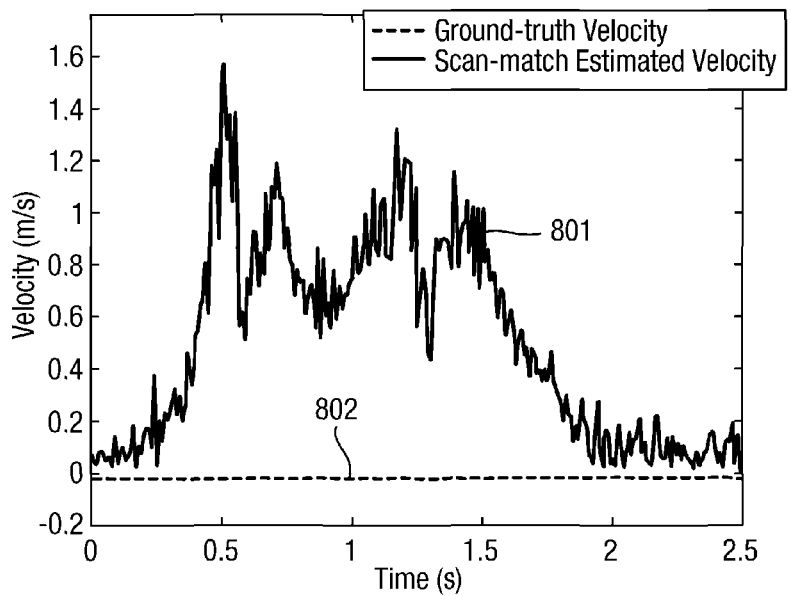
FIG. 8 is a graph relating to the data of FIG. 7.

The relative motion between moving objects (the car 704, shown in the image palette, and the scene background, and, in some cases, the vehicle 200 itself) cause points in the consecutive scans 701-703 to shift substantially, which introduces significant matching difficulties. FIG. 8 shows the results of running the ICS algorithm (during the velocity estimating step 406) over the scan data of FIG. 7. Velocity estimates as obtained from scan-matching are shown at solid line 801 as against ground-truth, shown as dotted line 802. As can be seen, scan-data from transient objects (e.g. the car 704) corrupted the scan-match estimate.

In order to try to prevent this kind of performance degradation, which occurs when objects in the scan have relative velocities, the present inventors devised a contextual sensor model that betters inform the sensor parameters, given some exogenous environmental cues. This model involves a function f that maps an input value λ to some output space:

$$f(\lambda) \mapsto \kappa, \lambda \in \mathbb{R}^n, \kappa \in \mathbb{R}^n$$

This function can be a vector of image features that corresponds to an index of a previously acquired image stream ($\mathbb{R}^m \to \mathbb{R}$); however, in the detailed embodiment the case of a floating-point value to a global UTM (x, y) position $\mathbb{R} \to \mathbb{R}^2$) is used. For a road network, a suitable representation of this mapping is a cubic spline.

For any sensor with parameters φ, the application 214 seeks to learn a probabilistic model of these parameters given spline position, λ. An important insight by the inventors here is that there is no privileged set of parameters that should be used for the lifetime of the sensor, and that different environments require different sensor parameters.

To correct/mitigate the aberrant behaviour illustrated in FIG. 8, the application 214 can learn/use a probabilistic filter that allows it to remove points from scans that degrade the performance of the scan-matching algorithm. The application can thus probabilistically filter points in scans that would be good match candidates, given where the vehicle 200 is in the world. A model for every transient obstacle encountered by the vehicle is not required—only a way of determining good versus bad regions of incoming scans.

Figure 9:
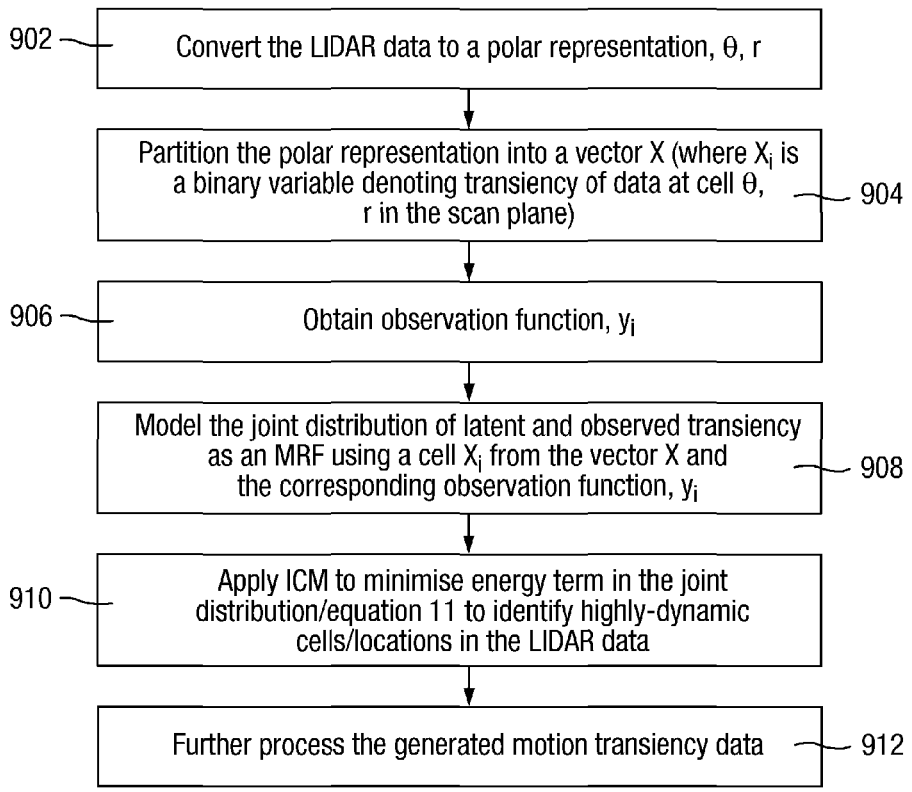
FIG. 9 is a flowchart showing example steps performed by the processor in some embodiments in order to improve velocity estimation.

FIG. 9 illustrates schematically an example of this method. Again, the skilled person will appreciate that these steps are exemplary only and that in alternative embodiments, some of them may be omitted and/or re-ordered. Typically, the steps may be part of the application 214, but in other embodiments they can be performed by another stand-alone application, or incorporated into another application with additional functionality, e.g. an object tracking application. At step 902, data from the second/horizontal LIDAR 204 are converted into points in a polar representation (θ, r). The application 214 seeks to learn a probability distribution p(θ, r|λ). Such a model is learnt for discrete locations along the spline parameterization, and therefore the application needs a way of learning the joint distribution p(θ, r) for each discretization.

Figure 10:
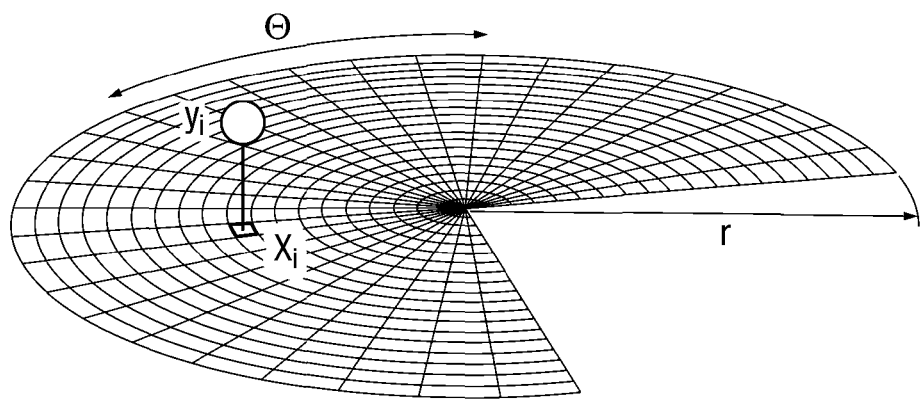
FIG. 10 shows a graphical model usable by the steps of FIG. 9.

At step 904 the input space is partitioned over range and angle into a vector X, where $X_i$ is a binary variable denoting the transiency of laser data observed in a discrete {θ, r} cell in the scan plane. This measure captures the reliability of sensor data from a certain cell. FIG. 10 depicts this model (it will be appreciated that this is for ease of explanation only and the application 214 does not need to generate this kind of graphical model and also can use techniques that do not necessarily use the exact equations described below in order to obtain the same results). The model can be used to estimate the transience of areas in the LIDAR scan plane, given a certain location A in the environment. The unobserved latent states, X, constitute the underlying transience of a certain location in the beam plane of the LIDAR. The observed values, y, are noisy estimates from historical training data, estimated by observing point misalignment in consecutive laser scans and can be obtained from a data store or the like by application 214 at step 906. The measure allows the application to determine, probabilistically, how much it can trust LIDAR data from a particular point in the world. During training noisy estimates of the transiency of scan cells are observed:

$$y_i = -1 + \frac{2}{1 + e^{-\gamma|z_i - \delta|}}$$

Figure 11:
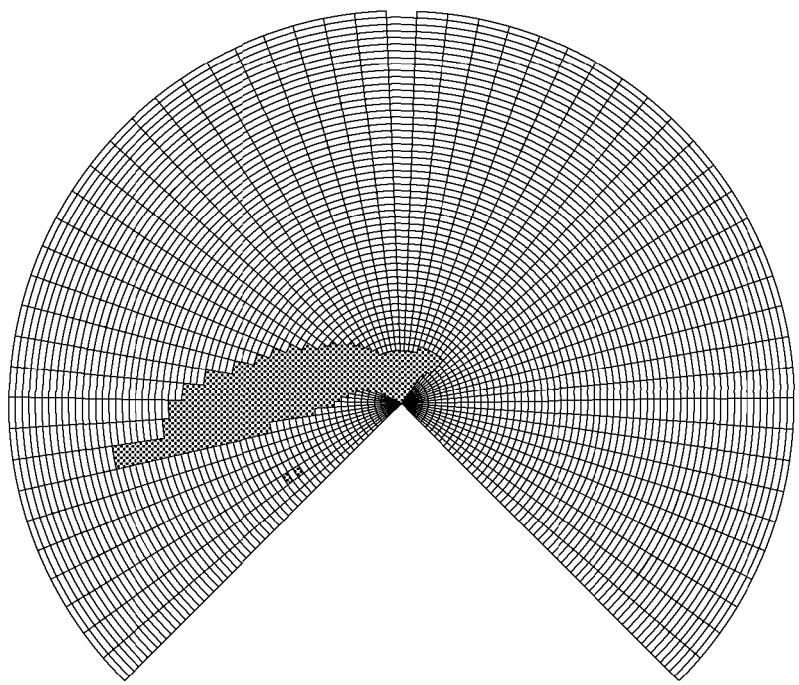
FIG. 11 illustrates the model with locations highlighted based on computed transiency values.

The above equation is a generalized logistic function where $z_i$ constitutes an observation of cell i in which points from consecutive laser scans differ by a certain tolerance, and γ and δ are scaling factors. These parameters may be hand-tuned for performance at given locations or can be learned automatically from labelled data. For the results shown, γ and γ are 0.5 and 50, respectively. The observation function maps an input—cell transients—to a value in the range {+1, -1}. This mapping function encodes a belief that the more motion observed in a cell, the less likely that cell is to be a good source of static scan-match candidates. By modeling the joint distribution of latent and observed transiency as a Markov Random-Field (MRF), at step 908, it is possible for the application to learn the joint distribution p(X; y):

$$E(X, y) = h\sum_i X_i - \beta\sum_{i,j} X_i, X_j - \eta\sum_i X_i, y_i$$

$$p(X, y) = \frac{1}{Z}\exp\{-E(X, y)\}$$

where the equation E(X, y) is the energy term, and the equation p(X, y) is the joint probability distribution (as appears in C. Bishop and S. S. en ligne, Pattern recognition and machine learning. springer New York, 2006, vol. 4) and Z is a normalisation constant. The parameters of the model—h, β and η—are set to predefined values. For the results shown, h, β and η were set as 0, 3 and 1, respectively. An Iterated Conditional Modes (ICM) technique (e.g. as disclosed in the Bishop an en ligne paper cited above) can then be applied by the application 214 at step 910 in order to (locally) maximise the values of X that minimise the energy term in the equation E(X, y). The skilled person will appreciated that there are several alternative inference techniques for graphical structures that can be used, including Belief Propagation and Markov-Chain Monte Carlo estimation through Gibbs sampling, for example. In the detailed embodiment, the resulting locally maximal X given by applying ICM to the observed data for the location shown in FIG. 7 over the model depicted in FIG. 10 are shown in FIG. 11 (by means of the shaded cells). It will be noted how the intersecting road has been learned to be an unreliable place for scan-matching.

At step 912, data produced by the previous steps can be processed further. Typically, this can involve labelling at least a portion of the data originally obtained from the second LIDAR device 204 with values indicating the computed motion transiency of the corresponding location(s). During the velocity estimation procedure (step 406), various portions of the LIDAR data may be processed differently depending upon their motion transiency values/labels, e.g. portions/location that have a high motion transiency value can be deemed to be highly-dynamic locations that are not conducive to generating accurate velocity estimate and so can be excluded from the scan-matching steps. It will also be appreciated that the generated data can be used in other ways by other applications where it is desirable to filter out dynamic obstacles, including potential object tracking and other localisation techniques.

It will be noted that the application 214 does not explicitly encode a vehicle model, but, rather, learns that roads—due to moving cars—are poor places to utilize scan match data. The inventors have shown that this learned distribution can be used to filter out LIDAR points that have a high probability of impinging on a transient object, and this improves the performance of the scan-matching algorithm. Examples of these results are presented in FIGS. 12 and 13.

Figure 1:
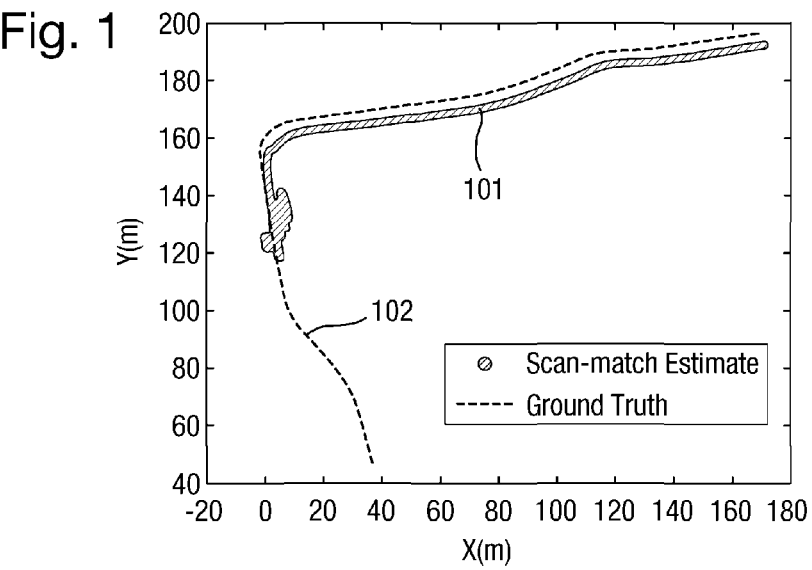
FIG. 1 is a graph illustrating problems with a prior approach to localisation.
Figure 12:
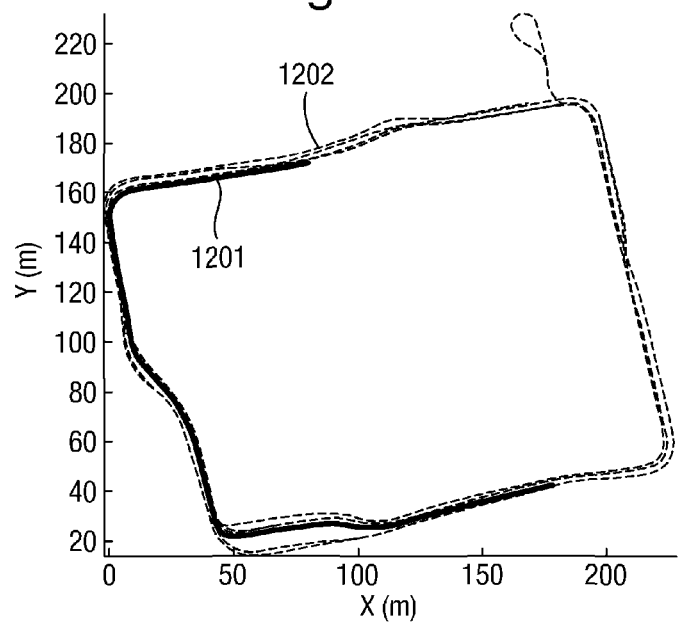
FIGS. 12 and 13 are graphs illustrating results of experiments based on the steps described herein.
Figure 13:
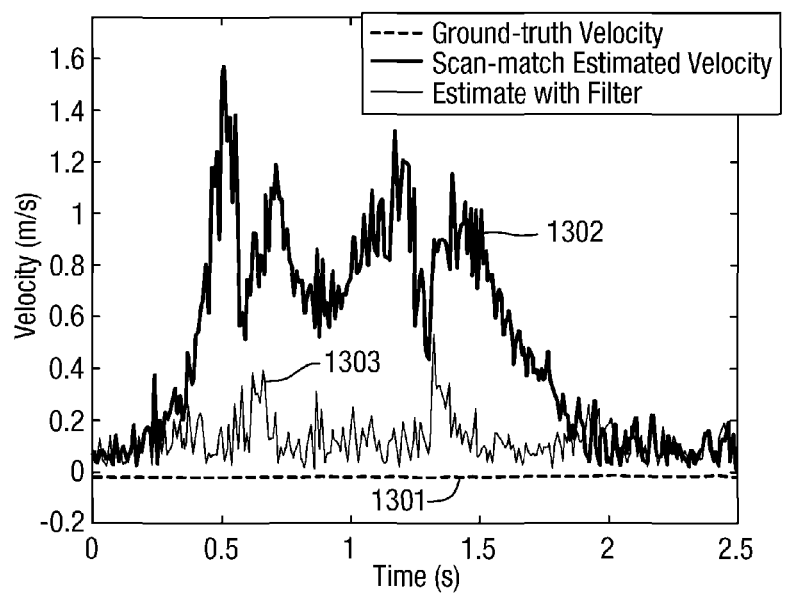

FIG. 12 details the results of applying the scan matching techniques described above, followed by the results of learning the contextual sensor model that is outlined in FIG. 9. FIG. 13 shows the estimated trajectory over the same data used in FIG. 1 using Algorithm 2 above only.

As can be seen from the estimated trajectory (darker solid line 1201) in FIG. 12, the system is not adversely affected by the large scene change in the building site. This is because that although there are various changes in the site, large prismatic structures (buildings, for example) are repeatedly observed over the long term. The graph shows two minutes of estimated trajectory (highlighted by the line 1201) using the described procedure with the same LIDAR data presented to the ICS-based algorithm in FIG. 1. It will be noted that even using maps that are quantitatively different from the current scene view, it is still possible to provide accurate SE2 poses within the prior map (lighter lines 1202).

FIG. 13 contrasts the original ICS-based velocity estimate with the same algorithm, but transient objects removed (i.e. with the method outlined in FIG. 9 being used). The graph is a comparison image, showing ground truth velocity 1301 against the velocities 1302 from FIG. 8, as well as the velocities 1303 calculated by the same ICS algorithm after removing highly-probable transients. As can be seen from the Figure, the signal-to-noise ratio has improved considerably. The application 214 has not utilised any form of feature identification or transient modelling in order to achieve this improvement, instead it relies on the probabilistic model of data observed over the long term.

The embodiments described herein present a system that can be based solely on 2D LIDAR data that is capable of localizing in the presence of large scene changes over an extended period. The inventors have shown that known scan-matching techniques—although robust and repeatable indoors—suffer in a complex outdoor scenario with drastic scene changes. They have further extended this framework with a probabilistic, contextual sensor-model that quantitatively improves the performance of the scan-matching algorithm in common, real-world situations.

The invention claimed is:

1. A method of localising a transportable apparatus within an environment, the method comprising:
    receiving data obtained from a first ranging sensor device of the transportable apparatus configured to collect information relating to a 2D representation of an environment through which the transportable apparatus is moving;
    receiving data obtained from a second ranging sensor device of the transportable apparatus configured to collect information relating to at least a surface over which the transportable apparatus is moving in the environment;
    using the second ranging sensor device data to estimate linear and rotational velocities of the transportable apparatus moving through the environment;
    using the estimated linear and rotational velocities with the first ranging sensor device data to generate a new 3D point cloud of the environment;
    obtaining data representing an existing 3D point cloud; and
    seeking to match the new 3D point cloud with the existing 3D point cloud in order to localise the transportable apparatus with respect to the existing point cloud.

2. A method according to claim 1, where the first and the second ranging sensor device respectively comprise first and second LIDAR devices and, in use, a beam of the second LIDAR device is aimed to strike the surface whilst the transportable apparatus is moving.

3. A method according to claim 2, wherein the second LIDAR device is directed at an angle corresponding to a main horizontal axis of the transportable apparatus.

4. A method according to claim 2, wherein the step of using the second LIDAR device data to estimate the linear and the rotational velocities includes scan-matching successive laser scans of the second LIDAR device data.

5. A method according to claim 4, wherein the scan-matching includes using an Iterative Closest-Surface (ICS) technique.

6. A method according to claim 5, wherein the linear velocity and the rotational velocity are each modelled as a Gaussian Process (GP).

7. A method according to claim 6, wherein the second LIDAR device data is windowed over a time period and the GP model is based on the windowed data.

8. A method according to claim 4, further including creating a probabilistic filter for computing motion transiency values for portions of the second LIDAR device data, and wherein the probabilistic filter is used to select portions of the second LIDAR device data to be used for the scan-matching.

9. A method according to claim 8, wherein the portions of the second LIDAR device data represent locations within the environment and the method further comprises:
generating polar coordinate representations of the locations in the second LIDAR device data portions;
partitioning the polar representations into a vector $X_i$, where a cell $X_i$ of the vector is a binary variable denoting transiency of data at a location cell i (having polar coordinates θ, r) in the second LIDAR device data;
obtaining an observation function ($y_i$) corresponding to a noisy estimate of motion transiency of the cell i based on a historical record of motion transiency relating to the cell location;
modelling a joint distribution based on a said cell $X_i$ from the vector X and the corresponding observation function ($y_i$), and
using the joint distribution to determine the transiency value of the cell location.

10. A method according to claim 1, wherein the seeking to match step comprises computing a transformation between the new point cloud and the existing point cloud.

11. A method according to claim 10, wherein the computing of the transformation includes:
generating a probability distribution representing the new point cloud;
generating a probability distribution representing the existing point cloud; and
comparing the new point cloud probability distribution with the existing point cloud probability distribution.

12. A method according to claim 11, wherein the comparing step involves computing a Kullback-Leibler divergence value between the new point cloud probability distribution and the existing point cloud probability distribution.

13. A method according to claim 12, wherein the Kullback-Leibler divergence value is used to compute an objective function f:

$$f(P, Q) = \sum_{i=1}^{N} H(Q)(i) \log \frac{H(Q)(i)}{H(P)(i)}$$

where P represents the existing point cloud probability distribution, Q represents the new point cloud probability distribution, H(.) represents a histogramming operation, N represents cardinality of a said probability distribution and I is an iterator over bins, and
the computing of the transformation involves seeking a said transformation that brings the new point cloud probability distribution and the existing point cloud probability into optimal alignment by minimising the objective function.

14. A non-transitory computer readable storage medium storing computer program code executable to perform stops comprising:
receiving data obtained from a first ranging sensor device of the transportable apparatus configured to collect information relating to a 2D representation of an environment through which the transportable apparatus is moving;
receiving data obtained from a second ranging sensor device of the transportable apparatus configured to collect information relating to at least a surface over which the transportable apparatus is moving in the environment;
using the second ranging sensor device data to estimate linear and rotational velocities of the transportable apparatus moving through the environment;
using the estimated linear and rotational velocities with the first ranging sensor device data to generate a new 3D point cloud of the environment;
obtaining data representing an existing 3D point cloud; and
seeking to match the new 3D point cloud with the existing 3D point cloud in order to localise the transportable apparatus with respect to the existing point cloud.

15. A transportable apparatus comprising:
a first ranging sensor device;
a second ranging sensor device;
a processor configured to execute computer program code; and
a non-transitory computer readable storage medium storing computer program code executable to perform steps comprising:
receiving data obtained from a first ranging sensor device of the transportable apparatus configured to collect information relating to a 2D representation of an environment through which the transportable apparatus is moving;
receiving data obtained from a second ranging sensor device of the transportable apparatus configured to collect information relating to at least a surface over which the transportable apparatus is moving in the environment;
using the second ranging sensor device data to estimate linear and rotational velocities of the transportable apparatus moving through the environment;
using the estimated linear and rotational velocities with the first ranging sensor device data to generate a new 3D point cloud of the environment;
obtaining data representing an existing 3D point cloud; and
seeking to match the new 3D point cloud with the existing 3D point cloud in order to localise the transportable apparatus with respect to the existing point cloud.

* * * * *